(12) United States Patent
Matsuoka

(10) Patent No.: US 9,067,324 B2
(45) Date of Patent: Jun. 30, 2015

(54) GRIPPING DEVICE, TRANSFER DEVICE WITH SAME, AND METHOD FOR CONTROLLING GRIPPING DEVICE

(75) Inventor: Hirofumi Matsuoka, Toyota (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 12 days.

(21) Appl. No.: 13/981,120

(22) PCT Filed: Dec. 29, 2011

(86) PCT No.: PCT/JP2011/080531
§ 371 (c)(1),
(2), (4) Date: Jul. 23, 2013

(87) PCT Pub. No.: WO2012/101953
PCT Pub. Date: Aug. 2, 2012

(65) Prior Publication Data
US 2013/0310980 A1 Nov. 21, 2013

(30) Foreign Application Priority Data
Jan. 26, 2011 (JP) .................................. 2011-014598

(51) Int. Cl.
*G05B 15/00* (2006.01)
*G05B 19/00* (2006.01)
(Continued)

(52) U.S. Cl.
CPC .............. *B25J 15/0004* (2013.01); *B25J 15/00* (2013.01); *B25J 15/0014* (2013.01);
(Continued)

(58) Field of Classification Search
CPC ........ B25J 9/1612; B25J 13/084; B25J 15/00; B25J 15/08; B25J 13/02; B25J 15/004; B25J 15/0014; B25J 15/0023; B25J 15/0028; B25J 15/0033; B25J 15/052; B25J 15/0071

USPC .......................................................... 700/260
See application file for complete search history.

(56) References Cited

U.S. PATENT DOCUMENTS 3,318,629 A * 5/1967 Brandt, Jr. .................. 294/103.1
3,675,962 A * 7/1972 Simpson ...................... 294/99.1
(Continued)

FOREIGN PATENT DOCUMENTS

CN 201026611 Y 2/2008
JP 56-114688 A 9/1981
(Continued)

*Primary Examiner* — Khoi Tran
*Assistant Examiner* — Harry Oh
(74) *Attorney, Agent, or Firm* — Sughrue Mion, PLLC

(57) ABSTRACT

A gripping device comprises: a gripping unit for gripping a work; a controller for controlling the gripping operation of the gripping unit; and contact sections attached to the gripping unit contacting the work, the contact sections being adapted to deform following the shape of the work, and to maintain the deformation. The gripping operation of the gripping unit presses the contact sections against the work to cause the contact sections to follow the outside of the work, and grips the work with the shape of the contact sections maintained. After predetermined number of times of gripping operation, the controller changes the positions of the contact points of the contact sections with the work when the work is gripped. As a result, different works having different shapes can be stably gripped and the lifetime of the contact sections can be extended to be longer than that of conventional products. The change, by the controller, in the positions of the points on the work with which the contact sections are in contact when the work is gripped is performed by shifting the contact sections in a plane vertical to the gripping direction.

5 Claims, 5 Drawing Sheets

(51) Int. Cl.
  *B25J 15/00* (2006.01)
  *B25J 9/16* (2006.01)
  *B25J 15/08* (2006.01)
  *B25J 15/02* (2006.01)

(52) U.S. Cl.
  CPC .......... *B25J 15/0052* (2013.01); *B25J 15/0033* (2013.01); *B25J 15/0071* (2013.01); *B25J 15/08* (2013.01); *B25J 15/0028* (2013.01); *B25J 15/02* (2013.01); *B25J 15/0023* (2013.01); *Y10S 901/27* (2013.01); *Y10S 901/31* (2013.01); *B25J 9/1612* (2013.01)

(56) References Cited

U.S. PATENT DOCUMENTS

| | | | |
|---|---|---|---|
| 4,893,458 A * | 1/1990 | Compton | 56/340.1 |
| 5,668,453 A * | 9/1997 | Muto et al. | 318/568.17 |
| 5,860,273 A * | 1/1999 | Laserson et al. | 56/340.1 |
| 7,810,307 B2 * | 10/2010 | Pellenc et al. | 56/340.1 |
| 8,240,729 B2 * | 8/2012 | Vittor | 294/86.4 |
| 8,534,728 B1 * | 9/2013 | Bosscher et al. | 294/86.4 |
| 8,534,729 B2 * | 9/2013 | Wilkinson et al. | 294/106 |
| 2003/0127872 A1 * | 7/2003 | Mannhart et al. | 294/106 |
| 2004/0186624 A1 * | 9/2004 | Oda et al. | 700/245 |
| 2010/0156127 A1 * | 6/2010 | De Kervanoael | 294/106 |
| 2013/0033050 A1 * | 2/2013 | Matsuoka et al. | 294/86.4 |

FOREIGN PATENT DOCUMENTS

| | | |
|---|---|---|
| JP | H068181 A | 1/1994 |
| JP | H09123082 A | 5/1997 |
| JP | 2001-129782 A | 5/2001 |
| JP | 2002113682 A | 4/2002 |
| JP | 2007-130720 A | 5/2007 |
| JP | 2007-130721 A | 5/2007 |
| JP | 2008-528408 A | 7/2008 |

* cited by examiner (a)

(b)

(a)

A-A Section

B-B Section (a)

(b)

GRIPPING DEVICE, TRANSFER DEVICE WITH SAME, AND METHOD FOR CONTROLLING GRIPPING DEVICE

CROSS REFERENCE TO RELATED APPLICATIONS

This application is a National Stage of International Application No. PCT/JP2011/080531 filed Dec. 29, 2011, claiming priority based on Japanese Patent Application No. 2011-014598filed Jan. 26, 2011, the contents of all of which are incorporated herein by reference in their entirety.

TECHNICAL FIELD

The present invention relates to a gripping device, a transfer device with the gripping device and a method for controlling a gripping device.

BACKGROUND ART

Conventionally, if a gripping device for gripping works is used to grip various works having different shape from each other, contact sections of the gripping device which directly contact the works should be changed corresponding to the shape of the work to be gripped. Thus, it is desired that the gripping device is capable of flexibly dealing with various works having different shapes from each other.

For example, JP 2008-528408 A or JP H09-123082 A discloses such gripping device that can grip various works having different shapes from each other.

The gripping device of JP 2008-528408 A or JP H09-123082 A is provided with contact sections including flexible bags containing a large number of particulate substances. The vacuum pump or the like is used to evacuate the inside of the bags or to release the vacuum, whereby the shape of the contact sections can be changed corresponding to the work shape.

The gripping operation of the gripping device makes the contact sections contact the work in order to change the shapes of the contact sections along the shape of the work, after that the flexible bags are vacuumed. Thereby, a lot of particulate substance is anchored with each other, and the shapes of the contact sections are maintained corresponding to that of the work. Releasing the vacuum of the flexible bags, the shapes of the contact sections are returned to the soft state.

CITATION LIST

Patent Literature

PTL 1: JP 2008-528408 A
PTL 2: JP H09-123082 A

SUMMARY OF INVENTION

Technical Problem

In the conventional gripping device, if the contact sections repeatedly grip the work at one contact point, the bags filled with the particulate substances suffer from the damage at the particular point, so that that point is likely to break. As the result of that, the conventional gripping device may have a short lifetime.

The objective of the present invention is to provide a technique of gripping various works having different shapes from each other and providing longer operating life than the conventional technique.

Technical Solutions

The first embodiment according to the invention relates to a gripping device for gripping a work which includes: a gripping unit for gripping the work; a controller for controlling the gripping operation of the gripping unit; and multiple contact sections attached to the gripping unit at contact points with the work, each of the contact sections being deformable following the outer shape of the work and being able to maintain the deformed shape. The gripping operation of the gripping unit makes the contact sections pressed to the work and deformed along the outer shape of the work, and the gripping unit grips the work where the deformed shape of the contact section is maintained. The controller changes the contact points of the contact sections with the work after gripping at predetermined times.

In a preferable embodiment of the invention, the controller shifts the contact points of the contact sections in a plane perpendicular to a gripping direction of the gripping unit.

The contact section preferably includes a bag in which a group of particulate substances are filled.

Furthermore, the shape of the contact section is maintained by evacuating the inside of the bag and increasing a volume ratio of the particulate substances relative to the internal volume of the bag so as to anchor the particulate substances with each other.

The second embodiment according to the invention relates to a transfer device, which is provided with the gripping device of the first embodiment. The transfer device is used for transferring the work upon gripping the work with the gripping device, and the transfer device comprises a robot arm adjusting the relative position between the gripping device and the work, the action of the robot arm being controlled by the controller.

The third embodiment according to the invention relates to a method for controlling a gripping device. The gripping device includes: a gripping unit for gripping the work; and multiple contact sections attached to the gripping unit at contact points with the work, each of the contact sections being deformable following the outer shape of the work and being able to maintain the deformed shape, wherein the gripping operation of the gripping unit makes the contact sections pressed to the work and deformed along the outer shape of the work, and the gripping unit grips the work where the deformed shape of the contact section is maintained. The controlling method includes changing the contact points of the contact sections with the work after gripping at predetermined times.

In the advantageous embodiment, the contact points of the contact sections are shifted in a plane perpendicular to a gripping direction of the gripping unit.

Advantageous Effects Of Invention

The embodiment according to the present invention provides the technique of gripping various works having different shapes from each other and providing longer operating life than the conventional technique.

Furthermore, without changing the structure of the conventional gripping device, the contact sections can prevent the local damage due to wear or tear.

DESCRIPTION OF EMBODIMENTS

Figure 1:
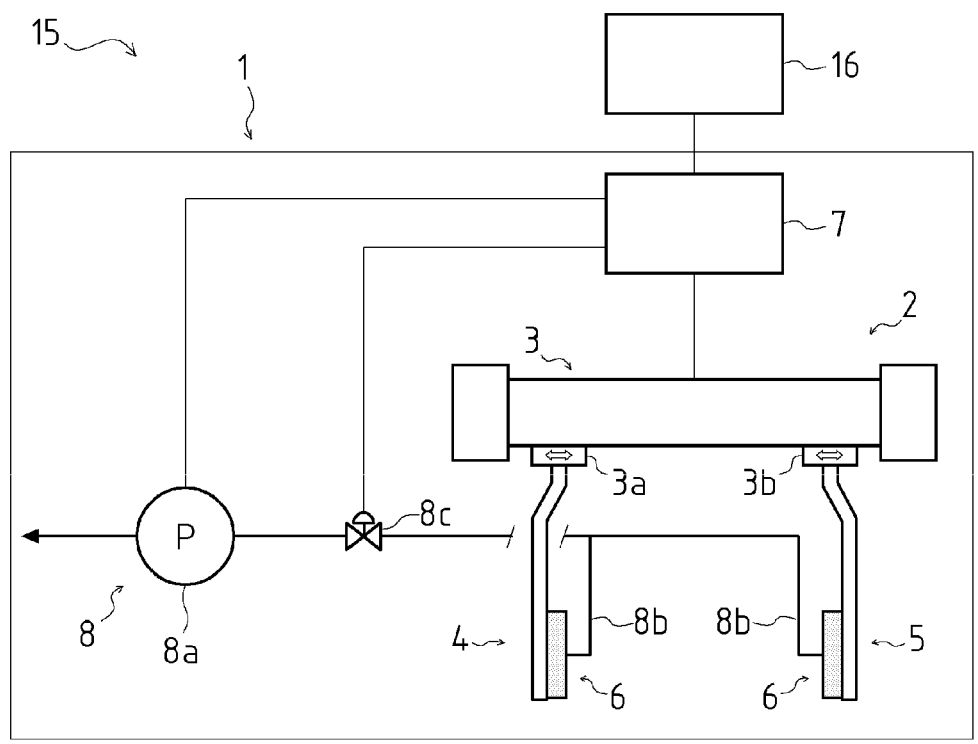
FIG. 1 depicts a transfer device, (a) shows a block diagram and (b) shows a front view (X-Z plane).
Figure 1:
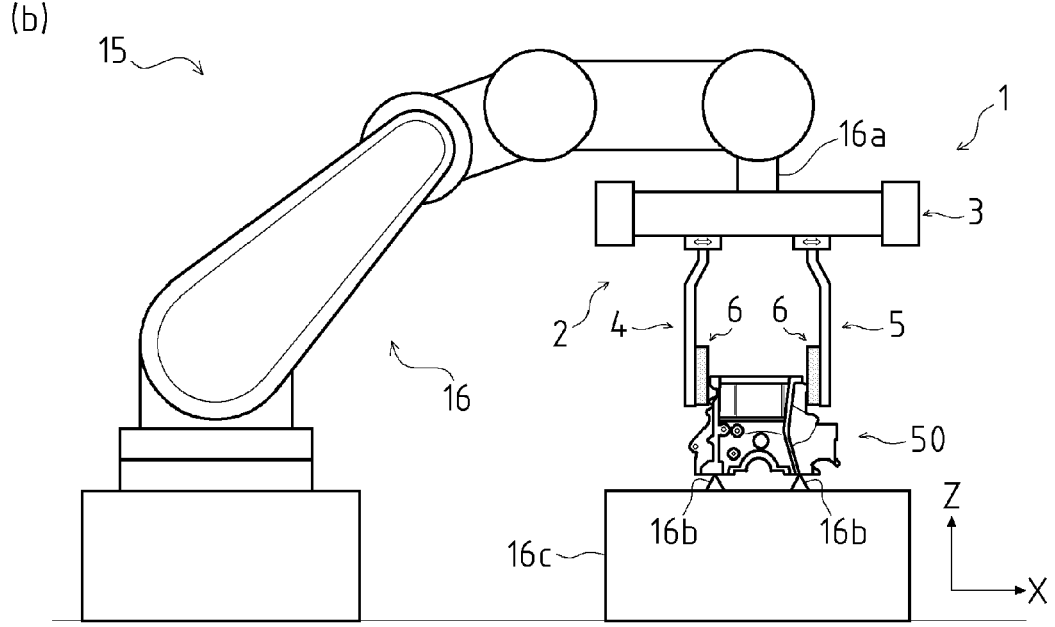
Figure 2:
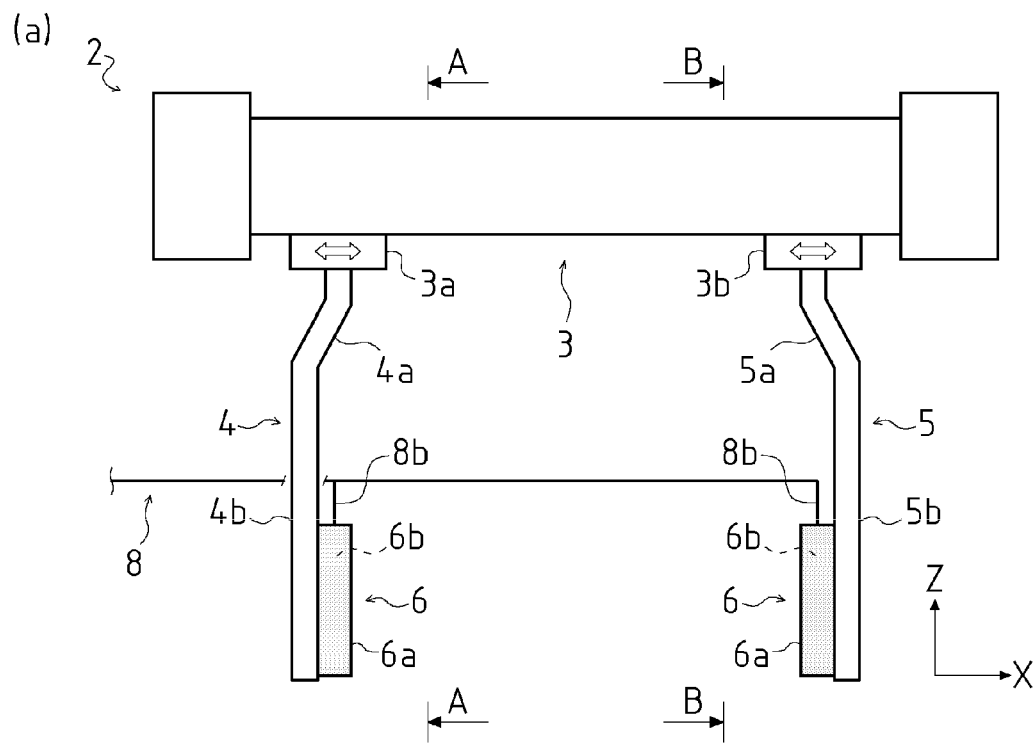
FIG. 2 depicts a gripping device, (a) is a front view (X-Z plane), (b) shows A-A section view, and (c) shows B-B section view.
Figure 2:
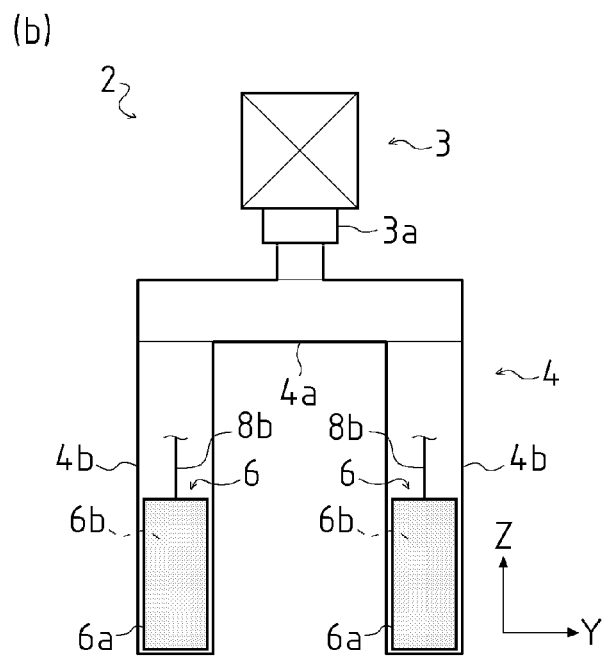
Figure 2:
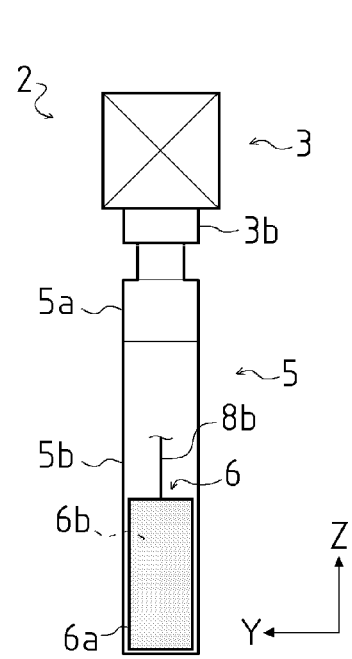
Figure 3:
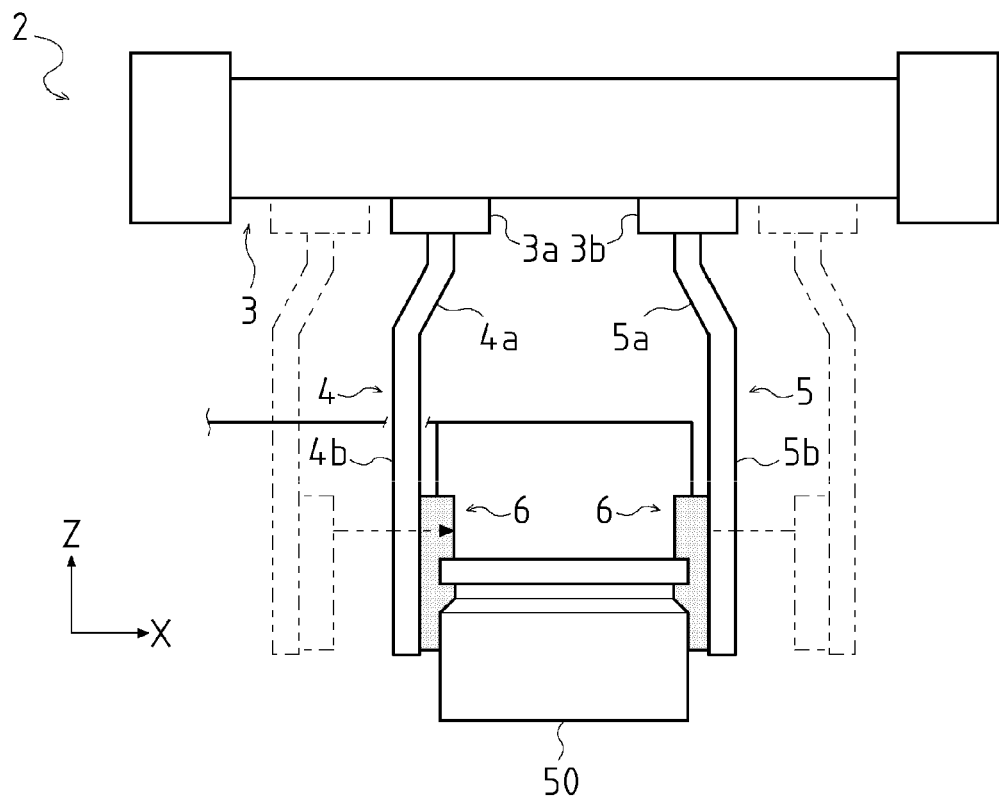
FIG. 3 illustrates a gripping operation of the gripping device, (a) is a front view (X-Z plane) and (b) shows a top view (X-Y plane).
Figure 3:
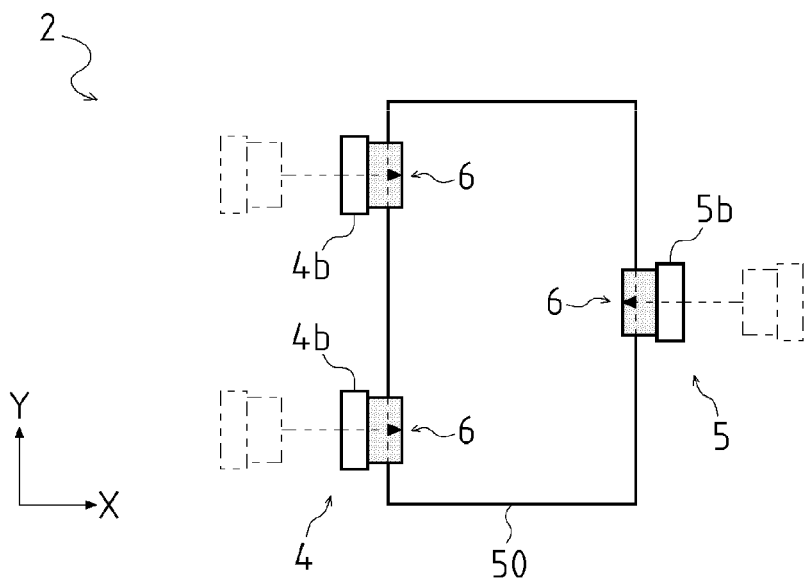

Referring to FIGS. 1 to 3, the structure of a transfer device 15 with a gripping device 1 is described.

Notice that in this embodiment, the XYZ coordinates as shown in FIGS. 1 and 2 are defined in the griping device.

As shown in FIG. 1, the transfer device 15 is used for transferring a work 50, including the gripping device 1 and a robot arm 16. The transferring device 15 holds the work 50 by the gripping device 1 and transfers the work 50 from the initial place to the desired place.

As shown in FIG. 1, the gripping device 1 includes a gripping unit 2, a controller 7 and vacuum equipment 8. The gripping device 1 is disposed at the hand 16a of the robot arm 16.

The gripping unit 2 directly grips the work 50, and includes an actuating unit 3, multiple claws 4 and 5, multiple contact sections 6.

As depicted in FIG. 2, the actuating unit 3 has two sliders 3a and 3b. The actuating unit 3 telescopically moves the sliders 3a and 3b separately in the X direction. The actuating unit 3 may be an electric actuator with reciprocating equipment having a ball screw, a nut and a motor.

The actuating unit 3 is electrically connected to the controller 7, which controls the movements of the sliders 3a and 3b of the actuating unit 3.

The pair of the claws 4 and 5 is configured to clamp the work. The claws 4 and 5 clamp and hold the work 50 located therebetween.

The structure of the claws 4 and 5 can be changed in accordance with a shape or size of the work, or with stroke amounts of the sliders 3a and 3b.

As depicted in FIG. 2, the first claw 4 has a support 4a fixed to the slider 3a and two clamp portions 4b supported by the support 4a. The clamp portions 4b are arranged apart from each other by the predetermined distance.

The second claw 5 has a support 5a fixed to the slider 3b and a clamp portion 5b supported by the support 5a.

The controller 7 actuates the sliders 3a and 3b, whereby the clamp portions 4b, 5b move telescopically in the X-direction. In such manner, the claws 4 and 5 move in the X-direction, and the clamping portions 4b and 5b hold the work 50 at three points from the lateral direction (X-direction).

The contact sections 6 of the gripping device 1 directly contact the work 50. Each contact section can provide a flexible structure and a solid structure, and can change the structure from the flexible structure to the solid structure (hardening) or from the solid structure to the flexible structure (softening). In the initial state of the gripping device 1, the contact sections 6 are in the flexible state (softened).

As illustrated in FIG. 2, the contact section 6 includes an elastic bag 6a, and a group of particulate substances 6b filled in the bag 6a.

The contact sections 6 are attached to the clamping portions 4b, 5b of the claws 4, 5 to face each other.

As depicted in FIG. 1(a), each of the contact sections 6 is connected to the vacuum equipment 8. The vacuum equipment 8 is configured to soften or harden the contact sections 6, and includes a vacuum pump 8a, a vacuum pipe 8b and an electric valve 8c. The bag 6a of the contact section 6 is communicated to the vacuum pipe 8b.

In the embodiment, the vacuum equipment 8 includes the vacuum pump 8a, but the other evacuating means such as an ejector may be employable.

Furthermore, the gripping device can employ various structures for softening and hardening the contact sections, i.e., means for softening and hardening the contact section is not limited to the vacuum equipment.

For instance, the vacuum pump 8a can be substituted for a check valve connected to the vacuum pipe 8b to evacuate air from the bag 6a. In such structure, the gripping operation leads the evacuation of air from the bag 6a, thereby hardening the contact section 6.

Evacuating the inside of the bag 6a by means of the vacuum pump 8a, the particulate substances 6b filled in the bag 6a are anchored with each other and the contact section 6 is hardened, whereby the shape of the contact section is solidly maintained.

In the softened state as shown in FIG. 3((a) and (b)), the contact sections 6 can be entered into the uneven surface including holes and projections existing on the surface of the work 50 by the clamping force acted by the clamp portions 4 and 5. The shapes of the contact sections 6 are deformed following the outer surface of the work 50.

After the contact sections 6 change their shapes corresponding to the outside of the work, the vacuum equipment 8 works, thereby hardening the contact sections 6 while the shapes are maintained. Thus, the solid contact sections 6 are formed in the shape corresponding to the outer shape of the work.

In this embodiment, the contact sections 6 are hardened by evacuating the inside of the bags 6a, but the gripping device according to the invention may employ various structures. For example, the particulate substances are substituted for magnetic powder, and the magnetic force due to the magnetic powder hardens the contact sections.

As depicted in FIG. 3, in the gripping unit 2, the clamping portion 5b is located at the center of the clamping portions 4b in the Y direction. Thus, three contact sections 6 disposed on the clamping portions 4b, 5b steadily grip the work 50. Such simple structure brings stable gripping, which can bear the swinging of the work 50.

In the embodiment, the gripping unit 2 has three-point support structure, but the work 50 may be held by means of other structure, such as two-point mounting with wide clamping portions or four-point support.

As depicted in FIG. 1, upon the transferring operation using the transfer device 15, the work 50 is positioned by positioning pins 16b and located at the predetermined position of a mounting place 16c.

The controller 7 is electrically connected to the robot arm 16 in which information regarding the position or angle of the hand 16a of the robot arm 16 is transmitted to the controller 7 as a feedback.

Referring to FIGS. 1 and 3, the controlling structure for the gripping device 1 and robot arm 16, during gripping the work 50 with the gripping device 1, is described below.

Controlling the robot arm 16, the position and angle of the hand 16a are adjusted such that the gripping unit 2 is located in the predetermined place being suitable to hold the work 50.

In other words, the robot arm 16 adjusts the relative position between the gripping device 1 and the work 50. In the embodiment, the position of the gripping unit 2 is set such that the contact sections 6 face the predetermined points of the work 50.

Thereafter, the controller 7 receives the signal from the robot arm 16 that the gripping unit 2 is located in the suitable position to hold the work 50.

After that, the controller 7 adjusts the strokes of the sliders 3a, 3b such that the distance between the claws 4 and 5 is smaller than the width of the work 50. The pair of the claws 4, 5 clamps the work 50 at the predetermined clamping pressure.

At that time, the contact sections 6 are pressed toward the work 50 and therefore deformed in accordance with the outer configuration of the work 50.

Clamping the work 50 with the predetermined pressure by the claws 4 and 5, the controller 7 transmits the signal to the vacuum pump 8a in order to evacuate the inside of the bag 6a of the contact sections 6. Thus, the group of the particulate substances 6b of the contact sections 6 is hardened in the shape corresponding to the outer shape of the work 50.

The contact sections 6 are hardened being sunk into the predetermined points of the work 50, so that the gripping unit 2 can hold the various works 50 each of which has different shape from each other without changing the gripping unit.

In the embodiment, the controller 7 adjusts the strokes of the sliders 3a, 3b so as to deform the contact sections 6 in response to the outer surface of the work 50, namely the contact sections 6 are controlled by their positions. However, the gripping structure is not limited to the embodiment. For example, detecting the servo electric current or torque amount while moving the sliders 3a and 3b, the stable gripping is determined by sensing that the torque mount becomes the predetermined value, i.e., the sliders 3a and 3b may be controlled by the torque amount thereof. Additionally, the gripping device may have both controlling structures based on the position control and torque control in order to deform the contact sections according to the work shape.

Hereinafter, referring to FIGS. 4 and 5, the method of controlling the gripping device 1 is described.

The gripping device 1 includes contact sections 6 capable of being hardened with shapes in accordance with the outer shape of the work 50. Therefore, the gripping device can keep gripping even if the contact sections 6 do not contact the same points of the work 50.

The gripping device 1 utilizes the features and grips the work 50 positively changing the contact points of the contact sections 6 with the work 50. The controller 7 memorizes the following program to change the gripping position.

Figure 4:
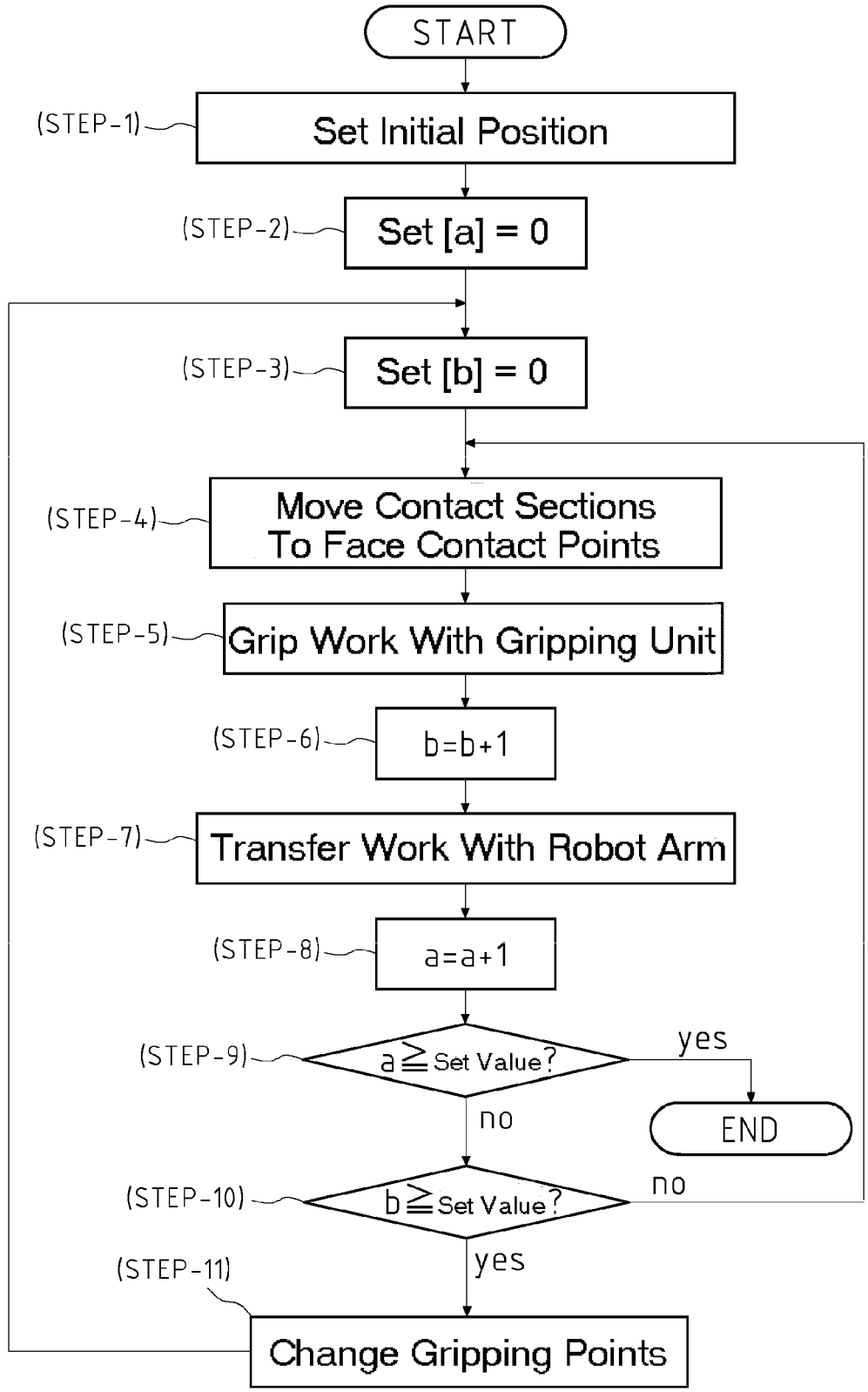
FIG. 4 is a flow sheet of controlling the gripping device.
Figure 5:
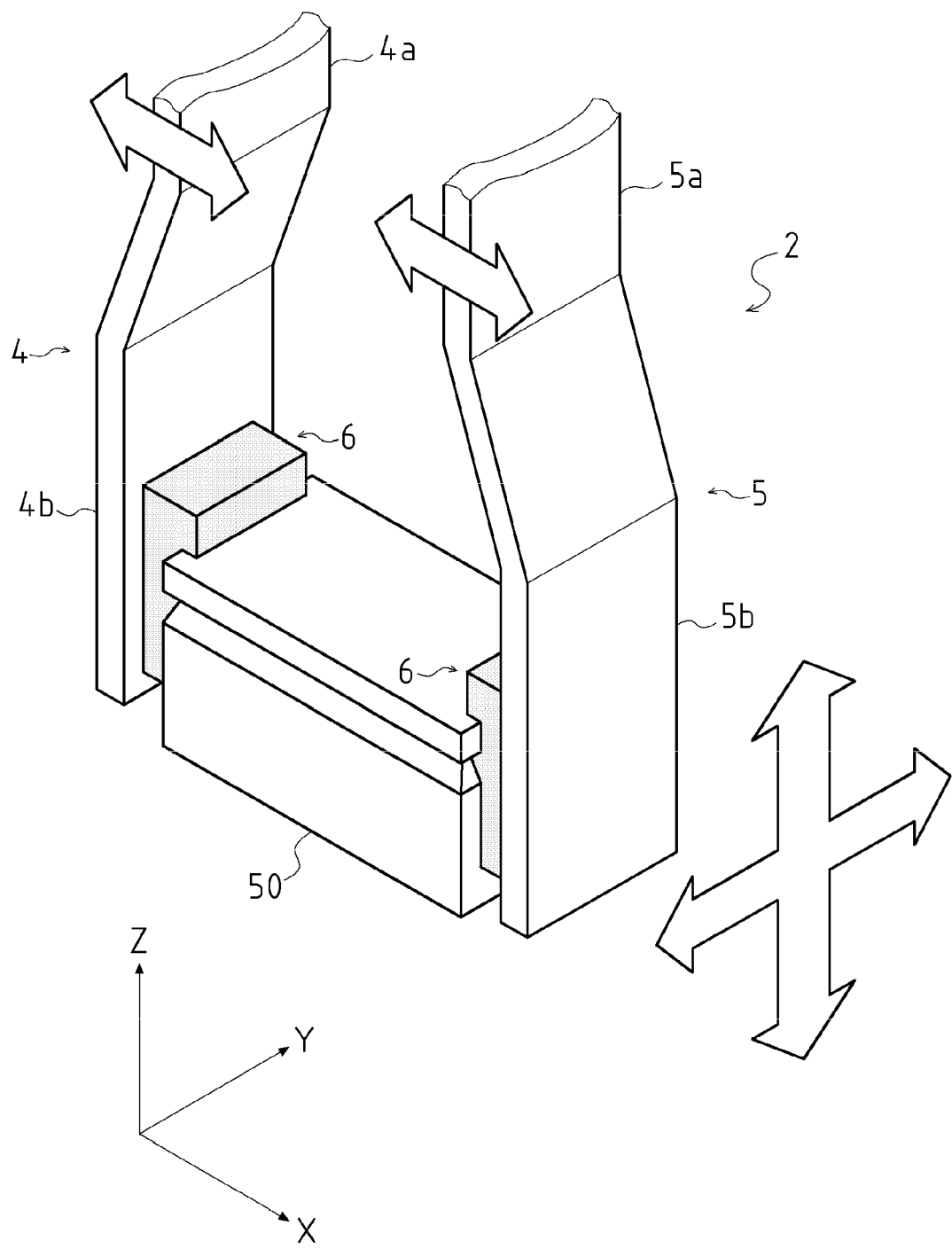
FIG. 5 is a perspective view showing a changing of the contact point of the gripping device.

As shown in FIG. 4, at the start of gripping operation by the gripping device 1, the controller 7 sets the initial position ((X, Y, Z) coordinate of the gripping unit 2) of the gripping device 1 where the work 50 is suitably gripped (STEP-1).

The controller 7 subsequently sets the initial number ([a]= 0) of the transfer count [a] of the transfer device 15 (STEP-2). The controller also sets the initial number ([b]=0) of the gripping count [b] with the gripping device 1 (STEP-3).

Based on the control signal from the controller 7, the robot arm 16 moves the gripping unit 2 such that each of the contact sections 6 faces the corresponding gripping points of the work 50 (STEP-4).

Based on the control signal from the controller 7, the actuating unit 3 is actuated so that the gripping unit 2 grips the work 50 (STEP-5).

The controller 7 adds "1" to the gripping count [b], thereby counting the number of the work 50 which is gripped through the contact sections 6 installed in the gripping unit 2 (STEP-6).

The controller 7 transmits the control signal to the robot arm 16 to transfer the work 50 to the predetermined place (STEP-7).

Here, the controller 7 adds "1" to the transfer count [a], thereby counting the number of the work 50 which is transferred by the gripping device 1 (STEP-8).

In the embodiment, the purpose of counting the transfer count [a] is to prevent the damage of the contact sections 6 while operating the manufacturing line, thereby preventing the unexpected stop of the line. The contact section 6 (or the bag 6a) has a certain lifetime based on the transfer count [a], and counting the number [a] allows the contact section 6 to be systematically changed before the contact section 6 has the damage. In an alternative method of setting the lifetime of the contact section 6, detecting the vacuum degree of the bag 6a after the evacuation, the contact section 6 will be replaced if the vacuum degree is lower than the predetermined value.

The controller 7 determines the lifetime on the basis of the transfer count [a] (STEP-9).

If the transfer count [a] is less than a set value, the transferring operation is continued and followed by next STEP-10.

On the other hand, if the transfer count [a] is not less than the set value, the transferring operation is stopped.

In the embodiment, the control algorithm in the controlling process for the gripping device 1 includes the determining process based on the transfer count [a], however, the control algorithm may not include such determining process.

If the transfer count [a] is less than the set value, the controller 7 subsequently determines the lifetime based on the gripping count [b] (STEP-10).

If the gripping count [b] is less than a set value, the former gripping points are maintained, and go back to the STEP-4.

If the gripping count [b] is not less than the set value, the controller 7 changes the gripping points (STEP-11), and go back to the STEP-3.

In the embodiment, the STEP-11 for changing the gripping points is performed by changing the positioning ((Y, Z) coordinate) of the gripping unit 2 by means of the robot arm 16 based on the control signal from the controller 7. For instance, the positioning of the gripping unit 2 is shifted by 10 [mm] or more in the Y-direction (lateral direction) and Z-direction (vertical direction). Thus, the contact points of the contact sections 6 with respect to the work 50 change due to the gripping count, or change after gripping at predetermined number of times.

The changing amount or direction of the gripping points may be selected within the range capable of stably gripping the work 50 with the gripping unit 2.

For example, once (every time) the gripping device 1 grips the work 50, the gripping points may be changed, or after gripping three times, the gripping points may be changed. The frequency for change can be chosen in accordance with the operation condition of the gripping device 1.

As a result, the contact sections 6 can be prevented from damages such as wear and tear in the particular point, thereby providing long lifetime of the contact sections 6.

In the gripping device 1, the contact points of the contact sections 6 with respect to the work 50 shift in the plane (Y-Z plane) perpendicular to the gripping direction (X-direction).

Therefore, without changing the conventional structure, the contact sections 6 can be easily prevented from local damages such as the wear or tear. Accordingly, the lifetime of the contact sections 6 can be improved.

In the embodiment, the robot arm 16 moves the gripping unit 2, thereby adjusting the position of the gripping points. However, the gripping device is not limited to the structure, but may employ the structure wherein the contact sections are capable of moving relative to claws and the gripping points of the contact sections change by predetermined intervals.

Moreover, changing the arrangement of the gripping unit 2, the gripping points for the work 50 are shifted, and the contact positions of the contact sections 6 are changed. However, the arrangement of the claws 4 and 5 may be changed for shifting the contact points of the contact sections 6 without modification of the structure of the gripping unit 2.

In the STEP-11 for changing the gripping points, the controller 7 preferably changes the displacement of the sliders 3*a* and 3*b* in the X-direction (stroke amount) in response to the shift of the gripping unit 2 in the Y-direction and Z-direction.

Thus, the contact sections 6 can be deformed along the outer shape of the work 50, thereby securing the gripping force of the gripping unit 2.

Industrial Applicability

The present invention can be applicable to a gripping device for gripping various works with various shapes.

Description of Numerals

1: gripping device, 2: gripping unit, 3: actuating unit, 4: claw, 5: claw, 6: contact section, 7: controller, 15: transfer device, 16: robot arm, 50: work

The invention claimed is:

1. A gripping device for gripping a work comprising:
   a gripping unit for gripping the work;
   a controller for controlling a gripping operation of the gripping unit; and
   multiple contact sections attached to the gripping unit at contact points with the work, each of the contact sections being deformable following an outer shape of the work and being able to maintain the deformed shape,
   wherein the gripping operation of the gripping unit makes the contact sections pressed to the work and deformed along the outer shape of the work, and the gripping unit grips the work where the deformed shape of the contact section is maintained, and
   wherein the controller changes the contact points of the contact sections with the work after gripping a predetermined amount of times, and
   wherein the controller shifts the contact points of the contact sections in a plane perpendicular to a gripping direction of the gripping unit changes the contact points of the contact sections in the gripping direction in response to the shifts of the contact points of the contact sections in the plane perpendicular to the gripping direction.

2. The gripping device according to claim 1,
   wherein the contact section comprises a bag filled with a group of particulate substances.

3. The gripping device according to claim 2,
   wherein the shape of the contact section is maintained by evacuating the inside of the bag and increasing a volume ratio of the particulate substances relative to the internal volume of the bag so as to anchor the particulate substances with each other.

4. A transfer device with the gripping device according to claim 1,
   wherein the transfer device is used for transferring the work upon gripping the work with the gripping device, and
   wherein the transfer device comprises a robot arm adjusting the relative position between the gripping device and the work, the action of the robot arm being controlled by the controller.

5. A method for controlling a gripping device, wherein the gripping device includes: a gripping unit for gripping the work; and multiple contact sections attached to the gripping unit at contact points with the work, each of the contact sections being deformable following an outer shape of the work and being able to maintain the deformed shape, wherein a gripping operation of the gripping unit makes the contact sections pressed to the work and deformed along the outer shape of the work, and the gripping unit grips the work where the deformed shape of the contact section is maintained, the method comprising:
   changing the contact points of the contact sections with the work after gripping a predetermined amount of times;
   shifting the contact points of the contact sections in a plane perpendicular a gripping direction of the gripping unit; and
   changing the contact points of the contact sections in the gripping direction in response to the shifting of the contact points of the contact sections in the plane perpendicular to the gripping direction.

* * * * *

UNITED STATES PATENT AND TRADEMARK OFFICE
CERTIFICATE OF CORRECTION

Page 1 of 1

PATENT NO. : 9,067,324 B2
APPLICATION NO. : 13/981120
DATED : June 30, 2015
INVENTOR(S) : Matsuoka It is certified that error appears in the above-identified patent and that said Letters Patent is hereby corrected as shown below:

In the Claims:

Column 8, line 1, claim 1, insert --and-- before "changes".

Column 8, line 37, claim 5, insert --to-- before "a gripping".

Signed and Sealed this
First Day of December, 2015

Michelle K. Lee
*Director of the United States Patent and Trademark Office*